United States Patent

[11] 3,602,237

[72] Inventors John C. Jurek
 Coral Gables;
 Oscar Csakvary, Miami, both of, Fla.
[21] Appl. No. 810,501
[22] Filed Mar. 26, 1969
 Division of Ser. No. 676,943, Oct. 20, 1967,
 Pat. No. 3,443,513.
[45] Patented Aug. 31, 1971
[73] Assignee Automated Building Components, Inc.
 Miami, Fla.

[54] WOODEN FRAMING FABRICATION SYSTEM
 10 Claims, 15 Drawing Figs.
[52] U.S. Cl. .................................................. 100/53,
 100/222, 227/152
[51] Int. Cl. ................................................... B30b 15/16
[50] Field of Search ........................................ 100/53,
 215, 222; 198/19; 227/152

[56] References Cited
 UNITED STATES PATENTS
 3,443,513 5/1969 Jureit et al. .................... 100/53

Primary Examiner—Billy J. Wilhite
Attorney—Le Blanc & Shur

ABSTRACT: The fabrication system comprises a conveyor operable to advance a jig table carrying wooden frame members positioned thereon forming a truss, panel or the like to successively locate the longitudinally spaced butt joints thereof below a press platen for embedment of nailplates of the type having a plurality of teeth stuck therefrom into the butt joints. The conveyor and press are controlled via a circuit including an index wheel actuated switch which automatically and sequentially stops the conveyor when successive butt joints are located below the press, actuates the press to embed the nailplates, and restarts the conveyor to advance the jig table to locate successive butt joints below the press. The index wheel is driven from the conveyor and has a plurality of recesses spaced a predetermined distance one from the other about the periphery thereof representing a predetermined distance of conveyor advance. A plurality of magnetic pins are inserted in selected recesses of the wheel and project to successively actuate the switch controlling the conveyor and press. The selectivity of the spacing between adjacent pins permits fabrication of trusses, panels or the like of different sizes and types.

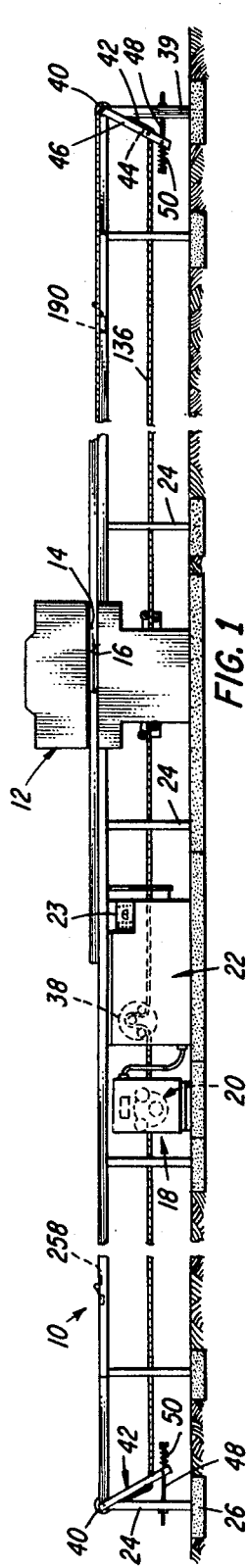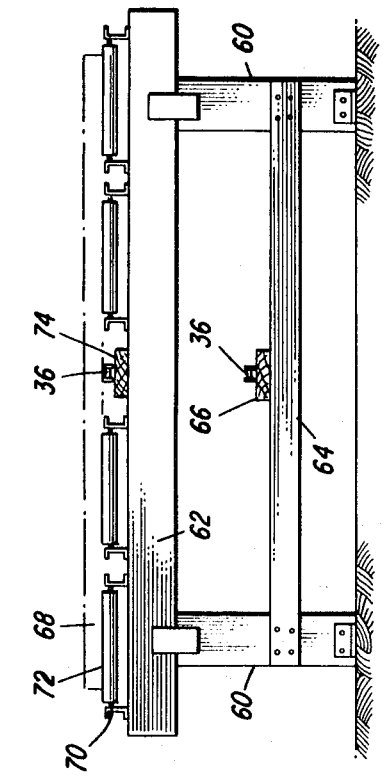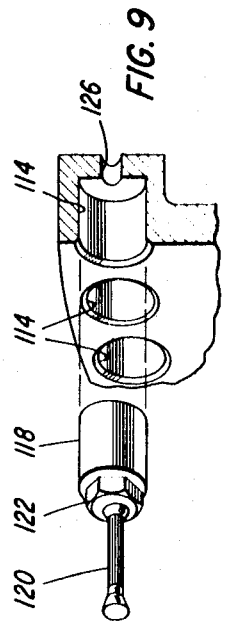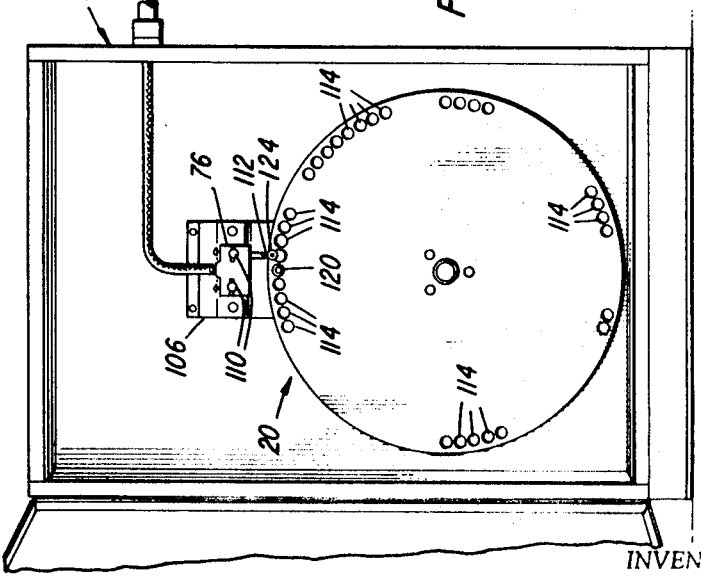

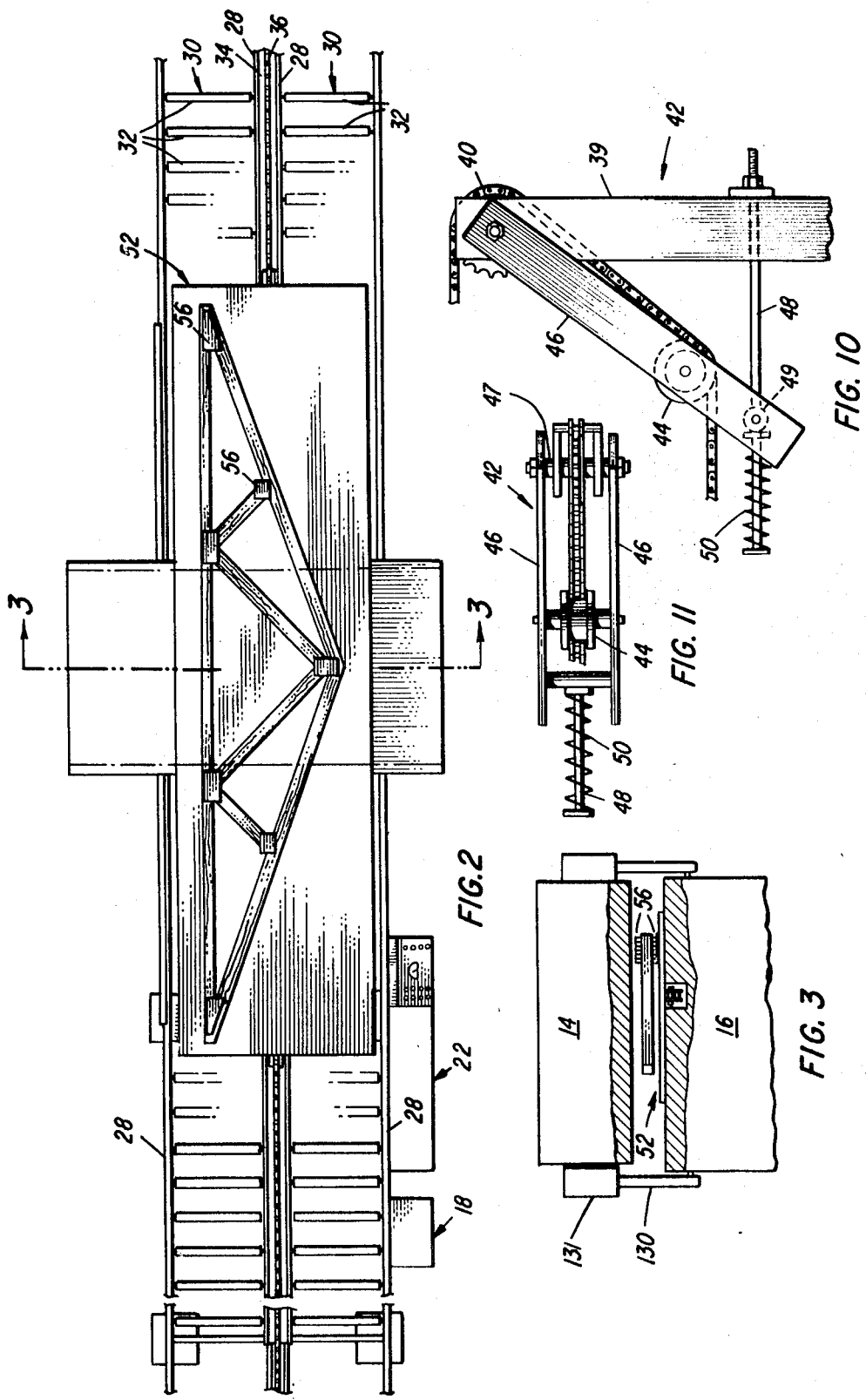

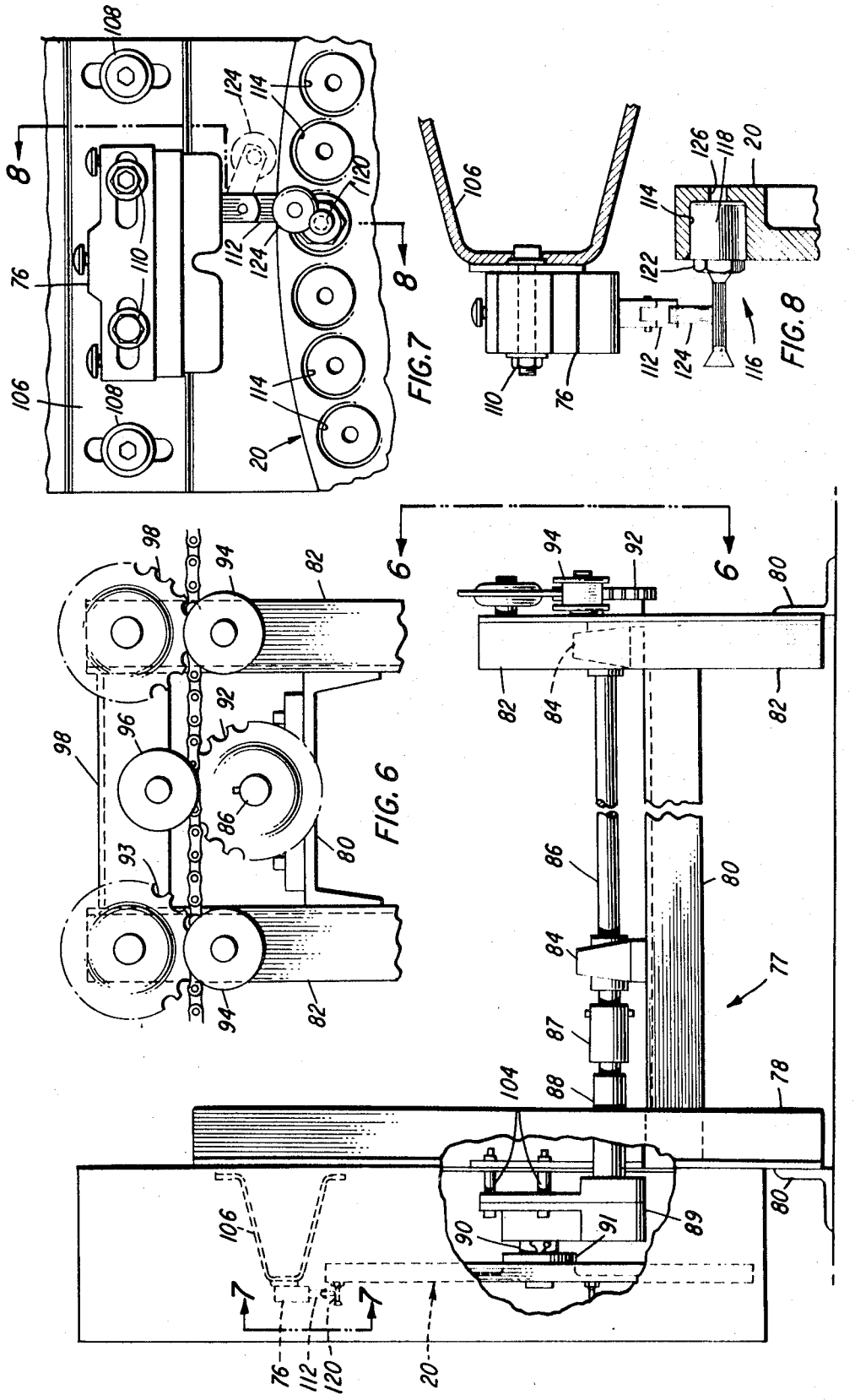

WOODEN FRAMING FABRICATION SYSTEM

This is a division of application Ser. No. 676,943, filed Oct. 20, 1967, now U.S. Pat. No. 3,443,513.

BACKGROUND OF THE INVENTION

The present invention relates to a system for fabricating wooden trusses, panels or the like and particularly to a conveyor, press and control apparatus therefor whereby nailplates are successively embedded in the spaced butt joints of wooden frame members forming the trusses, panels or the like.

The wooden building construction industry has recently made tremendous strides forward with the advent of fabrication techniques wherein butt joints of wooden frame members forming trusses, panels and the like are fastened together by embedding nailplates of the type having a plurality of teeth struck therefrom into the joints, typical nailplates for this purpose being described in U.S. Pat. No. 2,877,520. Previous methods of applying the nailplates to the butt joints, such as hand nailing, employing individual power-operated presses at each joint, etc., have been not only time consuming, laborious and accordingly expensive, but do not lend themselves to high production truss fabrication on an assembly line basis.

In conventional fabrication techniques which utilize power-operated truss presses, wooden frame members, consisting of elongated chords and cross members, are prepositioned in assembled relation on a jig table with connector plates located at opposite sides of the truss, panel or the like at the butt joints. Thereafter the connector plates are pressed into the butt joints to fasten the frame members together and form the completed truss, panel or the like. A press capable of providing the foregoing action is disclosed in U.S. Pat. No. 3,079,607. While this type of truss press is satisfactory, this press per se and others employed for like purposes are not particularly adapted for operation in conjunction with elongated trusses having widely spaced butt joints wherein the press head must be repeatedly raised and lowered and the jig table carrying the truss manually manipulated to locate each of the butt joints of the truss below the press head or platen for each press operation.

Other conventional fabricating techniques employ a plurality of fluid-operated press heads, each mounted on bases movable in longitudinal and transverse directions whereby the press heads are individually located relative to each butt joint of a particular size and type of truss. The plural presses are then simultaneously actuated to embed the several nailplates into the butt joints. The press heads thus employed, however, must be accurately and often laboriously repositioned for different sizes and types of trusses, panels or the like having different locations and spacings between the butt joints. Additionally, in most instances the press heads must be moved transversely of the truss, panel or the like to permit the same to be withdrawn from the press, thus necessitating repositioning of the several press heads for the completion of each truss, panel or the like, with the result of that rapid, efficient inexpensive fabrication of large numbers of even the same size and type of truss cannot be realized.

SUMMARY OF THE INVENTION

The present invention provides a unique fabrication system for automatically or manually forming completed trusses, panels or the like, hereinafter referred to as trusses. To accomplish this, wooden frame members are prepositioned on a jig table to form a truss and nailplates of the foregoing type are positioned on opposite sides of the butt joints. The jig table is mounted on a conveyor for advancement through and between the heads or platens of a press which is indexed to successively embed the nailplates in the butt joints as the jig table and frame members are successively advanced through the press. A control apparatus including an index wheel is provided to successively stop the jig table at predetermined positions along the conveyor in accordance with the predetermined successive longitudinal spacing between the butt joints of the prepositioned frame members to successively locate the butt joints thereof in pressing position below the press platen. In the automatic mode of operation, the conveyor is stopped, the upper press platen is lowered to press the nailplates into the butt joints and raised therefrom, and the conveyor is advanced, in response to sequential actuation of the control circuit actuating index wheel which rotates predetermined distances proportional to the successive longitudinal distances between the spaced butt joints.

Additionally, the index wheel of the present invention can be readily programmed to advance the conveyor and control the press to embed the nailplates in trusses of different sizes and types having variously spaced butt joints. The index wheel has a plurality of cylindrical recesses spaced predetermined distances one from the other about the periphery of the wheel corresponding to a predetermined advance of the conveyor. A plurality of pins are provided for releasable magnetic engagement in selected recesses whereby the spacing between the pins is a whole multiple of the peripheral spacing between the recesses. The wheel and pins are arranged to actuate a switch which cycles the conveyor stop, the press operation, and the conveyor advance, the pins actuating the switch in accordance with the predetermined spacing between the butt joints.

The index wheel is driven from the conveyor whereby conveyor and wheel positions are synchronized. Accordingly, the wheel position relative to the actuating switch is proportional to the distance the conveyor has advanced, the initial wheel setting or arrangement of the pins on the wheel corresponding to the initial conveyor position. After completely fabricating the truss and at the end of the conveyor advance whereupon the completed truss is unloaded, the jig table actuates limit switches to retract the jig table along the conveyor to its initial position and thus repositions the index wheel to its original position. Additional framing members can then be assembled thereon for advancement through the press as before. In this manner, the press control system can be set for a truss of a particular size and type and a plurality of like trusses can be subsequently formed without readjusting the conveyor and press setting.

To program the press control system for trusses of different sizes and types, the pins in the index wheel, being magnetically secured within the recesses, can be readily and easily withdrawn therefrom for reinsertion in other selected recesses to thereby vary the spacing between adjacent pins. Since the latter spacing is a function of the conveyor advance, the known longitudinal spacing between the butt joints of different sizes and types of trusses can be set into the index wheel by correlating such known spacing between the butt joints and the spacing between adjacent pins.

Accordingly, it is an object of the present invention to provide a fabrication system for successively embedding nailplates into the spaced butt joints of wooden frame members forming a truss, panel or the like.

It is another object of the present invention to provide a fabrication system which is readily and easily adjusted to form trusses, panels or the like of different types, sizes and shapes.

It is a further object of the present invention to provide a truss fabrication system which can be operated automatically or manually as desired.

It is still another object of the present invention to provide a truss fabrication system which is simple in construction, rapid in operation and inexpensive to manufacture.

It is another object of the present invention to provide a truss fabrication system including a press, conveyor and control therefor wherein the press and conveyor can be indexed for a particular size and type of truss and any number of identical trusses fabricated without resetting the press for each truss run.

It is still a further object to provide a control-actuating index wheel which can be readily and easily adjusted to a plurality of selected actuating positions.

It is still a further object of the present invention to provide a control-actuating index wheel having a plurality of predetermined spaced positions therealong and a plurality of actuating elements easily and readily secured in selected locations in said spaced positions.

These and further objects and advantages of the invention will become more apparent upon reference to the following specification, claims and appended drawings.

BRIEF DESCRIPTION OF THE DRAWING FIGURES

FIG. 1 is a side elevational view of a general arrangement of a fabrication system constructed in accordance with the present invention and shown with portions broken away for ease of illustration;

FIG. 2 is an enlarged fragmentary plan view thereof illustrating a jig table carrying a truss on a conveyor in pressing position with only the lower press platen being shown;

FIG. 3 is a transverse sectional view thereof taken about on line 3—3 of FIG. 2;

FIG. 4 is a side elevational view of the index wheel and cabinet therefor;

FIG. 5 is a transverse elevational view of the index wheel and its connection with the conveyor drive with portions thereof broken away for ease of illustration;

FIG. 6 is a fragmentary side elevational view of the drive connection between the index wheel and the conveyor drive taken about on line 6—6 of FIG. 5;

FIG. 7 is an enlarged fragmentary view of the actuating switch and pin assembly on the index wheel taken about on line 7—7 of FIG. 5;

FIG. 8 is a transverse cross-sectional view thereof taken about on line 8—8 of FIG. 7;

FIG. 9 is a fragmentary enlarged perspective view of the pin assembly on the index wheel;

FIG. 10 is an enlarged fragmentary elevational view of a conveyor chain-tensioning device;

FIG. 11 is a plan view thereof;

FIG. 12 is a transverse elevational view of another form of the conveyor;

DESCRIPTION OF THE PREFERRED EMBODIMENT

Figure 13:
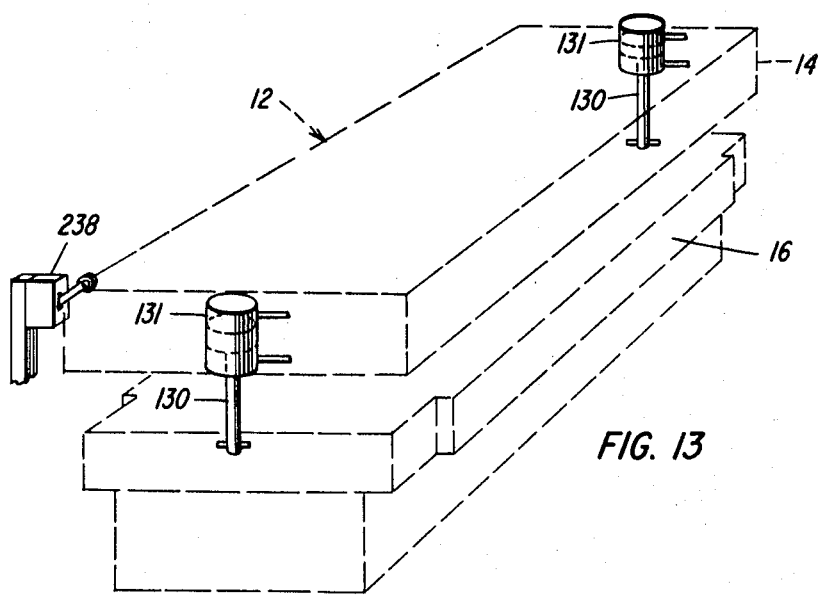
FIG. 13 is a schematic illustration of a fluid-operated press.

Referring to FIG. 1, there is shown the fabrication system of the present invention comprising generally a conveyor 10, a press 12 located substantially medially between the ends of conveyor 10 and having upper and lower press platens 14 and 16 respectively, a control system including a cabinet 18 housing an index wheel 20 and a control console 22 housing the electrical circuitry to be described and a suitable control panel 23. Conveyor 10 has a pair of upstanding legs 24 spaced longitudinally therealong, the lower ends of legs 24 being supported in footings 26 of the usual type and the upper ends thereof supporting four laterally spaced elongated parallel beams 28 as seen in FIG. 2. Beams 28 form a pair of transversely spaced conveyor sections 30 having longitudinally spaced rollers 32 journaled at opposite ends in the associated beams 28. An elongated central member 34 is located between conveyor sections 30 between the innermost beams 28 thereof and provides a guideway receiving conveyor drive chain 36. A hydraulic motor 38 drives chain 36 about suitable idler rollers 40 mounted on centrally disposed stanchions 39 located beyond opposite ends of conveyor 10 and about rollers 44 of chain-tensioning devices 42 mounted on stanchions 39. As best seen in FIGS. 10 and 11, tensioning devices 42 each comprise a pair of arms 46 pivotally mounted adjacent their upper ends to the upper ends of stanchions 39 and pivotally mounting roller 44 therebetween as by pin 47. A rod 48 is pivotally mounted to the lower end of stanchion 39 and extends through a pin 49 pivotally mounted between the lower ends of arms 46. A spring 50 is carried on the end of rod 48 and bears against pin 49 to bias arms 46 in a direction to tighten chain 36.

As best seen in FIG. 2, a jig table 52 is carried on rollers 32 and has a pair of depending lugs (not shown) which connect with opposite ends of chain 36 whereby jig table 52 is driven along conveyor 10 by chain 36. Wooden framing members 54 are prepositioned on jig table 52 to form a truss, the framing members 54 being held in suitable positions on jig table 52 by a plurality of clamps (not shown) which may be of the type illustrated in U.S. Pat. No. 3,241,585. Nailplates 56 are provided at the butt joints of the truss on opposite sides thereof, and, as seen in FIG. 2, the plates 56 to the right of press 12 have been embedded in the butt joints while the plates 56 to the left of press 12 remain to be embedded, the jig table 52 being advanced along conveyor 10 in the direction from left to right.

Another form of conveyor 10, illustrated in FIG. 12 and which is wider than the conveyor illustrated in FIGS. 1 and 2, may be employed herewith to accommodate trusses having larger widths requiring larger jig tables. This form of conveyor comprises a pair of transversely spaced legs 60 supporting a plurality of transversely extending members 62 at longitudinally spaced positions along the conveyor. The lower ends of legs 60 are suitable secured in footings as in the previous form and a transverse member 64 joins the transversely spaced legs and provides a support for an elongated beam 66 which supports chain 36 below the conveyor. In this instance, four longitudinally extending conveyor sections 68 are provided, each having a pair of elongated transversely spaced beams 70 pivotally mounting a plurality of longitudinally spaced rollers 72 therebetween. A central support beam 74 is mounted on members 62 to guide chain 36 along the top of the conveyor.

Referring now to FIGS. 4–9, the control system includes the index wheel 20 which is driven in rotation by chain 36 and arranged to successively actuate a microswitch 76. As seen in FIG. 5, wheel 20 is mounted for rotation on a frame assembly, generally indicated 77, comprising a pair of longitudinally spaced upright stanchions 78 suitably mounted on footings 26 as by angle brackets 80, stanchions 78 being located adjacent one side of conveyor 10 and suitably mounted cabinet 18. Frame 77 includes a transversely extending base frame 80 suitably connected at its inner end to a pair of upright stanchions 82 which lie below conveyor 10 adjacent the centerline thereof. Base frame 80 mounts a pair of bearings 84 and opposite end portions of shaft 86 are journaled in bearings 84. A drive coupling 87 connects the outer end of shaft 86 with the inner end of an axially reduced shaft 88, the outer end of the latter driving reduction gearing 89 secured to stanchions 78 within cabinet 18. A reduction gearing output shaft 90 is keyed to the hub 91 of wheel 20. A drive sprocket wheel 92 is suitably keyed on the inner end of shaft 86 and a pair of idler sprocket wheels 93 are journaled adjacent the upper ends of stanchions 82. A pair of idler wheels 94 are journaled on stanchions 82 below idler sprocket wheels 93 and a third idler wheel 96 is journaled in a cross frame 98 secured at opposite ends to stanchions 82, idler wheel 96 being located above the drive sprocket wheel 92. Chain 36 extends longitudinally in threading engagement with drive and idler sprocket wheels 92 and 93. Respective idler wheels 96 and 94 maintain chain 36 in driving engagement with sprocket wheel 92 and in engagement with sprocket wheels 93. Accordingly, when motor 38 drives chain 36 about rollers 40 and 44 in a clockwise direction as seen in FIG. 1 to advance jig table 52 along conveyor 10, index wheel 20 is simultaneously rotated therewith through drive sprocket wheel 92, shafts 86 and 88, and reduction gearing 89 for purposes as will presently become clear.

As seen in FIGS. 5, 7, and 8, a microswitch 76 is mounted on a bracket 106 secured to the inner wall of cabinet 18, bracket 106 being mounted for vertical adjustment within cabinet 18 by screws 108 and switch 76 being mounted on bracket 106 for longitudinal adjustment by bolts 110 whereby depending switch-actuating arm 112 is adjustably positioned relative to wheel 20. Switch 76 is a one-way actuated microswitch which energizes a circuit to automatically advance jig table 52 along conveyor 10, stop jig table 52, lower and raise press platen 14 to embed nailplates 56, and restart the conveyor to further advance jig table 52 as will be described hereinafter.

As seen in FIGS. 4, 7, 8, and 9, wheel 20 has a plurality of cylindrical recesses 114 opening through the outer face and adjacent the periphery thereof, recesses 114 being spaced a predetermined distance one from the other. A plurality of pins 116 having cylindrical bases 118 are provided for insertion and snug retention in selected recesses 114 for purposes to be described. Each pin 116 has an elongated shank portion 120 having a threaded inner end (not shown) which threadedly engages within a complementary recess in base 118 whereby shank portions 120 of pins 116 project from the face of wheel 20. A jam nut 122 secures the connection between pin 116 and base 118. The surface of shank portion 120 is preferably serrated and engages against roller 124 on the end of arm 112 to actuate switch 76.

It is a significant feature of the present invention that pins 116 are releasably secured in the selected recesses 114 in a manner which provides for the ready and rapid withdrawal of pins 116 therefrom and reinsertion of the same into other selected recesses. To this end, wheel 20 is formed of a ferromagnetic material, preferably steel, and bases 118 of pins 116 are permanent magnets, preferably formed of Alnico 5. Accordingly, to insert in or rearrange the pins on wheel 20 to provide for the actuation of switch 76 in a desired time sequence, pins 116 can be readily and rapidly withdrawn from or inserted in selected recesses 114 as the magnetic attraction between bases 118 thereof and wheel 20 assures secure retention of the pins in the recesses as well as easy withdrawal of the pins therefrom. An opening 126 is provided through the rear face of wheel 20 into each recess 114 to equalize the pressure on opposite sides of the pin, thereby facilitating the insertion and withdrawal of each pin 116.

It is also a feature hereof that switch 76 is successively actuated in response to consecutive predetermined advances of jig table 52 along conveyor 10 distances equal to the distances between successive butt joints to thereby locate each butt joint successively below press platen 14 for embedment of the associated nailplates. Switch 76 is successively actuated in accordance with the predetermined spacing between the peripherally next adjacent pins 116. The spacing between next adjacent recesses 114 is proportional to a predetermined distance advanced by jig table 52 on conveyor 10 through the index wheel drive mechanism and reduction gearing 89. In the preferred form, reduction gearing 89 provides for a rotary advance of index wheel 20 equal to the peripheral distance between the centers of next adjacent recesses 114 for each one foot of jig table travel on the conveyor 10. Accordingly, if pins are inserted in successive next adjacent recesses 114, switch 76 would be successively actuated for each one foot of advance of the jig table along conveyor 10. Similarly, locating pins 116 in every other recess would provide for successive actuation of switch 76 for every two feet of jig table advance. In this manner, trusses of various sizes and types having various spacing between their butt joints can be readily fabricated by locating pins 116 in selected recesses spaced one from the other in accordance with the spacing between the butt joints, it being understood that platens 14 and 16, in the preferred form, have a width extending in the longitudinal direction of the conveyor at least equal to 1 foot.

Figure 14:
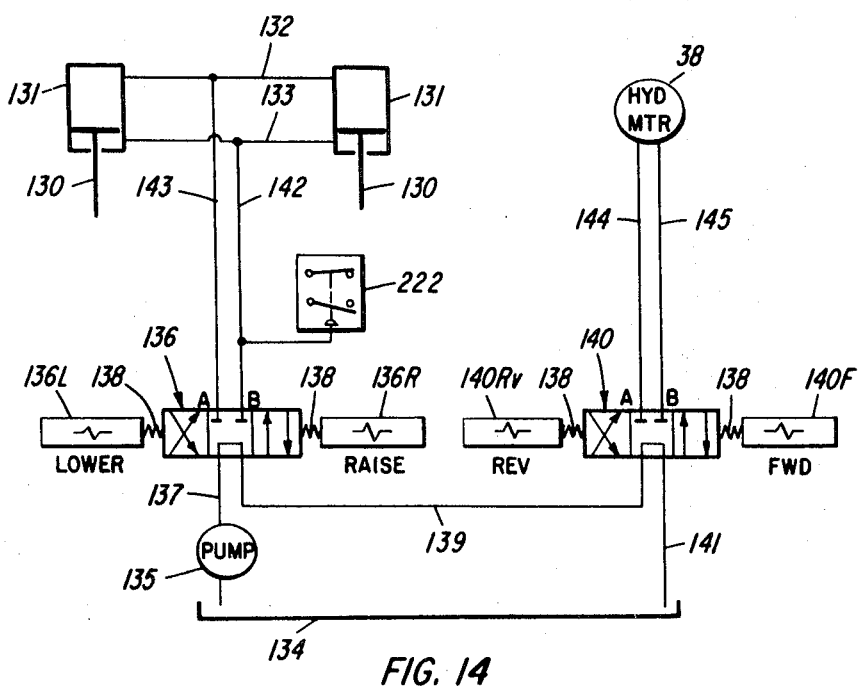
FIG. 14 is an electrical hydraulic schematic diagram illustrating the fluid controls for the press and conveyor drive.
Figure 15:
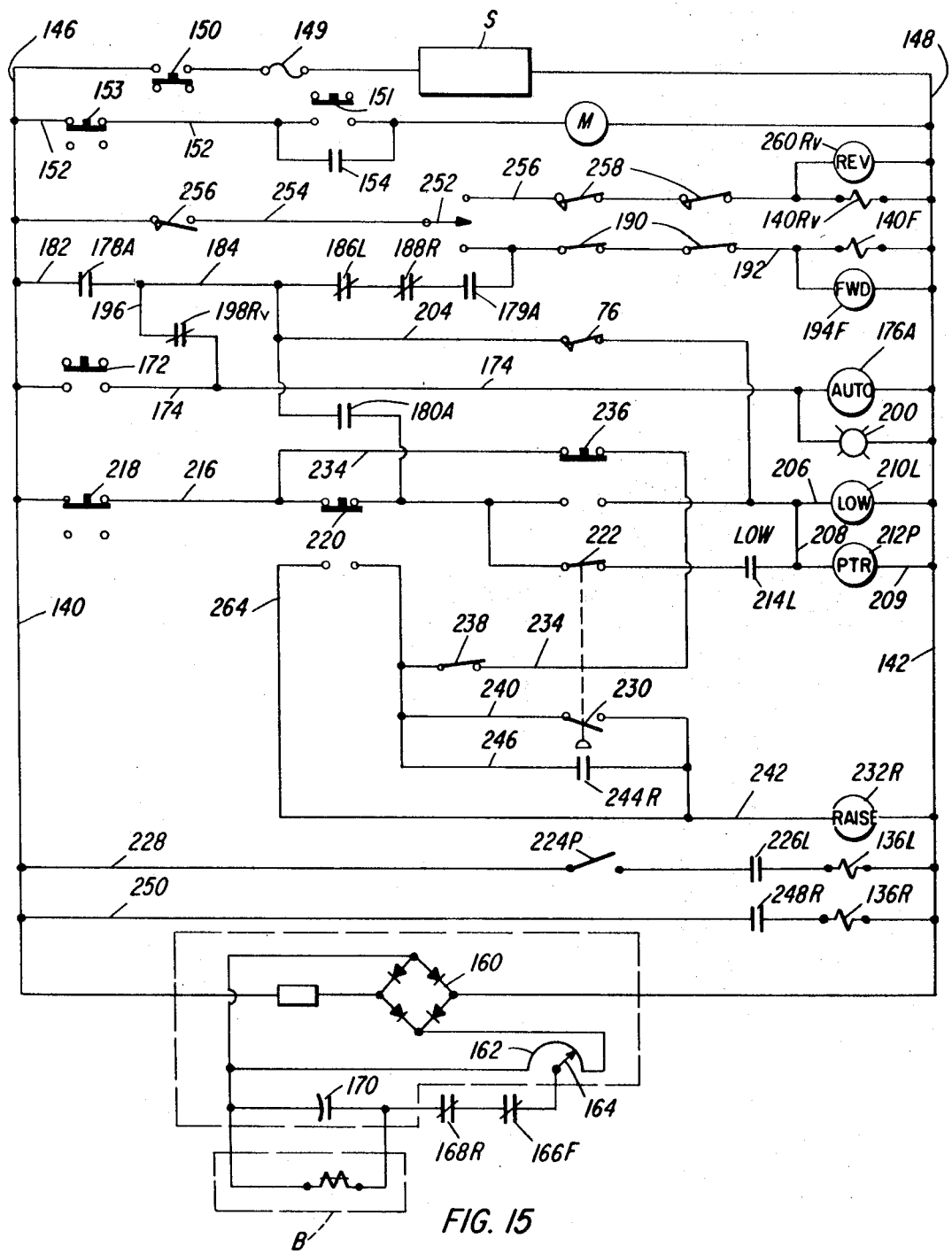
FIG. 15 is a schematic illustration of the electrical controls for the press system of the present invention.

As illustrated in FIGS. 13 and 14, an electrically controlled fluid circuit is provided and arranged in controlling relation to conveyor drive motor 38 and to the fluid-actuated press 12. Press 12 is illustrated schematically by the dashed lines, the upper platen 14 being movable with respect to the fixed lower platen 16 by a pair of fluid-operated pistons and cylinders 130 and 131, respectively. Cylinders 131 are fixed on opposite ends of movable platen 14 and a pair of fluid lines 132 and 133 (FIG. 14) alternately supply pressurized fluid to opposite sides of cylinders 131 to reciprocate platen 14. Fluid from a reservoir 134 is pressurized by an electrically driven pump 135. Fluid from pump 135 flows to a four-way, three-position control valve 136 via a conduit 137. Valve 136 is biased to the illustrated neutral position by a pair of springs 138 whereat input conduit 137 communicates directly with an intermediate conduit 139 connected to a like four-way, three-position control valve 140. Valve 140 is similarly biased to the illustrated neutral position whereat conduit 139 communicates with a return conduit 141 emptying into reservoir 134.

A pair of solenoids 136L and 136R are arranged to shift valve 136 to alternately lower and raise press platen 14 and are actuated in a manner to be described. Actuation of solenoid 136L shifts valve 136 to the right as seen in FIG. 14 to provide pressurized fluid via conduits 137, 142, and 133 to the lower sides of cylinders 131 to lower platen 14 with pressure fluid exhausting from the upper sides of cylinders 131 through conduits 132, 143, 139 and 141 to reservoir 134. Actuation of solenoid 136R shifts valve 136 to the left to provide pressurized fluid via conduits 137, 143, and 132 to the upper sides of cylinders 131 to raise platen 14 with pressure fluid exhausting from the lower sides of cylinders 131 via conduits 133, 142, 139, and 141 to reservoir 132.

A pair of solenoids 140Rv and 140 F are arranged to shift valve 140 and are actuated in a manner to be described to alternately operate motor 38 in the forward or reverse directions, thereby respectively advancing or retracting jig table 52 along conveyor 10. It will be noted with reference to the control circuit hereinafter described that valve 138 is always in the neutral position when the conveyor is being either advanced or retracted and that valve 140 is always in the neutral position when press platen 14 is being lowered or raised. Actuation of solenoid 140F shifts valve 140 to the left as seen in FIG. 11 to provide pressurized fluid via conduits 137, 139, and 144 to motor 38 to drive conveyor chain 36 forwardly with exhaust fluid returning to reservoir 132 via conduits 145 and 141. Actuation of solenoid 140Rv shifts valve 140 to the right to provide pressurized fluid via conduits 137, 139 and 145 to motor 38 to drive the conveyor chain 36 in the reverse direction to retract jig table 52 with exhaust fluid returning to reservoir 132 via conduits 144 and 141.

The electrical circuit disclosed in FIG. 14 is arranged to sequentially shift valves 136 and 140 to advance jig table 52 along conveyor 10, stop jig table 52, lower and raise platen 14, and restart conveyor 10, to repeat the foregoing conveyor press cycle successively as the butt joints are successively located below platen 14 and to retract jig table 52 along conveyor 10 after the truss is completely fabricated and removed therefrom. The control circuit is illustrated in a detached contact mode wherein the various relays, represented by circles, open and close associated contacts in a manner to be described, normally open and closed contacts being denoted by the vertical pairs of parallel lines and the slashed pairs of vertical parallel lines respectively, with the contacts having letter suffixes corresponding to the letter suffixes of their actuating relays. A power source S is provided across a pair of supply lines 146 and 148, supply line 146 including a suitable fuse 149 and an emergency conveyor-press stop pushbutton switch 150 which, when depressed as illustrated, breaks whatever completed circuit is controlling the press or conveyor operation. To start the fabricating system, fluid motor 135 is actuated by momentarily depressing a motor start pushbutton 151 which completes a circuit through motor starter coil M via lead lines 146, 152, a normally closed motor stop pushbutton 153 and lead line 148. Energization of coil M closes normally open contact 154 which maintains the motor circuit energized for continuous operation after motor start button 151 is released. Actuation of fluid pump 135 pressurizes the circuit as described hereinbefore whereby fluid is maintained available for subsequent operation of press cylinders 131 and hydraulic motor 38.

A brake circuit is energized across lead lines 146 and 148 and comprises a bridge rectifier 160 having a potentiometer 162 across the output thereof. Potentiometer arm 164 is connected in series with contacts 166F and 168R and capacitor 170 to actuate a brake B connected in parallel with capacitor 170, brake B being suitably connected to the drive connection between motor 38 and chain 36 to brake jig table 52 as the latter is advanced or retracted along conveyor 10.

Frame members 54 are now prepositioned and clamped, by means not shown, on jig table 52 with nailplates 56 located on opposite sides of the butt joints. To commence fabrication in the automatic mode of operation and to initially advance jig table 52 along conveyor 10, a pushbutton 172 is momentarily depressed to energize a circuit via lead lines 146, 174 and 148 which actuates the automatic mode relay 176A, which in turn closes normally open contacts 178A, 179A, and 180A. Closing of contacts 178A and 179A energizes a circuit via lead lines 146, 182, and 184, through normally closed contacts 186L and 188R, through a pair of normally closed limit switches 190 and lead lines 192 and 148 to actuate solenoid 140F and a relay 194F. Actuation of relay 194F opens normally closed contact 166F to deenergize the brake circuit, thereby releasing chain 36 for forward travel along conveyor 10. Actuation of solenoid 140F shifts valve 140 to the left as seen in FIG. 14 to drive motor 38 and chain 36 in the forward direction as hereinbefore described, thereby advancing jig table 52 along conveyor 10 toward press 12. It will be noted that closing of contacts 178A energizes an automatic mode-holding circuit via leads 146, 182, and 196, through normally closed contact 198R and lead lines 174 and 148 to maintain relay 176A actuated on an automatic mode indicator light 200 lit on console 22 via a lead line 202 after automatic mode pushbutton 172 has been released.

Wheel 20 is initially synchronized with the conveyor advance in a manner as will presently become clear to actuate microswitch 76 when the first of the butt joints of a particular size and type of truss is located below the upper press platen 14, it being understood that subsequent switch actuating pins are located in selected recesses 114 as hereinbefore described and behind the first pin location. Actuation of switch 76 energizes a circuit via lead lines 146 and 182, closed contact 178A, lead lines 184, 204, 206, 208, 209, and 148, to actuate a press-lowering relay 210L and a pneumatic timing relay 212. Actuation of relay 210L opens normally closed contacts 186L, thereby deenergizing solenoid 140F whereby valve 140 is spring-returned to the illustrated neutral position to interrupt the hydraulic circuit to motor 38. Opening contact 186L also deenergizes relay 194F whereby contacts 166F return to the normally closed position to actuate brake B to stop forward movement of jig table 52 and prevent further forward coasting thereof. Actuation of relay 210L closes normally open contacts 214L to energize a holding circuit via lead line 216, a normally closed press stop button 218, normally closed press raise pushbutton switch 220, a normally pressure-actuated switch 222, and lead lines 208, 206, 209, and 148 to maintain relays 210L and 212P actuated as pins 116 advance slightly beyond the actuating position of switch 76.

Actuation of relay 212P closes normally open switch 224 after a short time delay, normally open contacts 226L being closed in response to actuation of relay 210L. Solenoid 136L is thus energized after a short time delay via a circuit comprising lead lines 148, 228, closed switch and contacts 224 and 226L respectively, and lead line 148. As seen in FIG. 14, valve 136 is thus shifted to the right to complete fluid circuit from reservoir 134 to the lower sides of cylinders 131, thereby lowering press platen 14 as described before.

At the bottom of the press stroke, interconnected pressure-actuated switches 222 and 230 reverse momentarily to actuate a press raising relay 232R via a circuit comprising lead lines 146, switch 218, lead lines 216, 234, normally closed press lowering pushbutton switch 236, a limit switch 238 which is open only when press platen 14 is raised, lead line 240, pressure switch 230 which is closed at the end of the press downward stroke, and lead lines 242 and 148. Momentarily opening switch 222 breaks the press-lowering holding circuit to deenergize relays 210L and 212P, thereby opening contact 226L and switch 224 to deenergize solenoid 136L and opening contacts 186L and 214L. Simultaneous actuation of relay 232R opens normally closed contact 188R to open the circuit through the conveyor forwarding solenoid 140F and relay 194F. Relay 232R also closes normally open contact 244R to energize a press raising holding circuit via lead lines 146, 216, 234, 246, 242, and 148 to maintain relay 232R energized after switch 230 opens at the beginning of the press upstroke. Relay 232R also closes normally open contacts 248R to energize solenoid 136R via a circuit comprising lead lines 146, 250 and 148. As seen in FIG. 14, valve 136 is shifted to the left and a fluid circuit is completed from reservoir 134 to the upper sides of cylinders 131 to raise press platen 14.

At the end of the upstroke of platen 14, the latter opens limit switch 238 to deenergize the press-raising holding circuit and relay 232R whereby contacts 244R and 248R are returned to their normally open position and contact 188R returned to its normally closed position. Opening contact 248R deenergizes solenoid 136R whereby valve 136 is biased to its neutral position by springs 138 as illustrated in FIG. 11. The return of contact 188R to the normally closed position energizes the foregoing described circuit to the conveyor forwarding solenoid 140F and relay 194F, whereby normally closed contact 166F is opened to deenergize brake B. Valve 140 is again shifted to the left to pressurize motor 38 to advance the jig table 52 along the conveyor.

It will be appreciated that the foregoing described cycle of operation, that is, conveyor advancing, stopping, press lowering and raising, and conveyor advancing, is repeated as many times as the number of pins in wheel 20 which corresponds to the number of longitudinally spaced butt joints in the truss. As hereinbefore described, the spacing of pins 116 about index wheel 20 is proportional to the distance that the jig table 52 advances on conveyor 10 such that switch 76 is successively actuated to initiate the conveyor stopping, press lowering and raising, and conveyor restarting operations as the butt joints are successively positioned in press position below platen 14. For example, for a truss having three butt joints with the intermediate butt joints spaced 10 feet behind the initial butt joint and the last butt joint spaced 9 feet behind the intermediate joint, the pins 116 are arranged on the wheel 20 such that the first pin is inserted in recess 114 which would actuate switch 76 when the first butt joint is in position below platen 14. The next pin would be inserted in a selected recess 114 corresponding to a conveyor advance of 10 feet which would, in the preferred form, locate such next pin 10 recesses behind the first recess. The third pin would accordingly be located in a recess corresponding to an additional conveyor advance of 9 feet and would therefore be located in the recess nine recesses behind the intermediate pin. In this manner, trusses of different types having different sizes and spacing between the butt joints may be fabricated.

After the truss is completely formed, jig table 52 is continuously advanced along conveyor 10 until it actuates a pair of normally closed limit switches 190 located adjacent the end of conveyor 10. Opening switches 190 deenergizes solenoid 140F and relay 194F to retain contact 166F to its normally closed position thereby braking and stopping the jig table advance. The completed truss can then be removed from jig table 52.

To reverse the jig table travel along conveyor 10 and retract the same to the initial position, a jig drum switch 252 is closed by a press operator to energize a circuit via leads 146, 254, and 256, closed limit switches 258 and lead line 142 to actuate conveyor reversing relay 260Rv and solenoid 140Rv. Relay 260Rv opens normally closed contact 168R to release brake B and opens contact 198Rv to deenergize the automatic mode-holding relay 176A and solenoid 140Rv shifts valve 140 to complete a fluid circuit from a reservoir 134 to drive motor 38 in the reverse direction. Motor 38 accordingly retracts jig table 52 along conveyor 10 through press 12 in the reverse direction until it opens limit switches 258 located at the forward loading end of the conveyor 10 to deenergize relay 260Rv and solenoid 140R whereby contact 168R is closed to energize brake B and contact 198Rv is again closed. Jig table 52 is thus repositioned at the loading end of the conveyor and index wheel 20 is simultaneously rotated therewith in the opposite counterclockwise direction as seen in FIG. 4 to its initial position for the start of another run fabricating a truss of similar size and type having similar spacing between the butt joints. In the automatic mode, only start pushbutton 172 and drum switch 252 need be manually operated.

The complete truss fabrication cycle can be operated manually. Moreover, the manual controls may be employed to locate the initial or first pin position on wheel 20 in an initial test run and thereafter a large number of like trusses may be fabricated in the automatic mode as hereinbefore described. To cycle the conveyor and press manually, jig drum switch 252 is closed to energize solenoid 140F and relay 194F via a circuit comprising lead lines 146, 254, 192, and 148. The jig table 52 advances from the loading position as before with wheel 20 rotating therewith until the first butt joint is located below press platen 14, at which time the press operator opens jig drum switch 252 to deenergize solenoid 140F and relay 194F. With wheel 20 thus located, the first pin 116 is inserted in the recess 114 which locates the pin for actuation of switch 76. To lower the press platen, pushbutton 236 is depressed to energize relays 210L and 212P via the circuits comprising lead lines 146, 216, 206, 208, 209, and 148, valve 136 shifting as before to lower platen 14.

At the bottom of the downstroke, switches 222 and 230 momentarily reverse to deenergize the relays 210L and 212P and button 220 is depressed to complete a circuit via lead lines 146, 216, 234, 264, 242, and 148, to energize relay 232R. Relay 232R operates to shift valve 136 as before and limit switch 238 opens at the end of the upstroke of platen 14 to deenergize relay 232. Drum switch 252 is again manually closed by the operator to complete the circuit through solenoid 140F and relay 194 to further advance jig table 52 along conveyor 10 such that the next butt joint is located below press platen 14. The placing of pin 116 in wheel 20 and manual operation of the press and conveyor cycle is repeated for as many butt joints as there are in the truss whereby, at the completion of the fabrication cycle, pins 116 are located in selected recesses 114 to automatically stop the conveyor and initiate the press cycle for any number of the same type and size of trusses that are to be fabricated in the automatic mode. Alternately, subsequent pins may be inserted in selected recesses behind the first pin in accordance with the measured spacing of the butt joints behind the first butt joint inasmuch as the advance of the conveyor and wheel are synchronized for proportionate advancement in a predetermined ratio.

It will thus be appreciated that any number of like trusses, panels or the like may be fabricated after the pins in the index wheel are initially set to selected positions corresponding to the known distances between the spaced butt joints.

It is also significant that the press control system can be readily, easily and rapidly set up to accommodate trusses, panels or the like having different spacing between the butt joints therefore whereby high production rates can be attained, not only for like trusses, panels or the like, but also for a wide range of size, type of configuration of different trusses, panels or the like.

The invention may be embodied in other specific forms without departing from the spirit or essential characteristics thereof, The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters patent is:

1. A fabrication system for successively embedding connector plates in the spaced butt joints of prepositioned wooden framing members forming trusses or the like comprising means for supporting the wooden frame members, a press adjacent said support means for embedding the connector plates into the butt joints of the members, means for mounting said support means and said press for relative movement with said press defining a press position at each juxtaposition of said press and the butt joints of the members carried by said support means, means providing for relative movement between said support means and said press to locate successive butt joints of the wooden members in successive press positions for embedment of the connector plates into the wooden members at the butt joints thereof, and means arranged in controlling relation to said moving means including index means operable in response to relative movement of said support means and said press successive distances equal to the distances between consecutive butt joints to successively actuate said press and embed the connector plates into the wooden members at the butt joints thereof.

2. A fabrication system according to claim 1 wherein said control means includes switch means and said index means includes means carrying a plurality of spaced switch-actuating elements, the spacing between adjacent actuating elements being proportional to the predetermined spacing between the butt joints, and means providing for relative movement between said switch means and said carrying means for successive actuation of said switch means.

3. A fabrication system according to claim 2 wherein said carrying means includes a plurality of mounting positions for said elements, means releasably retaining said elements in said mounting positions, said elements being movable between mounting positions to selectively vary the spacing between adjacent elements.

4. A fabrication system according to claim 3 wherein adjacent mounting positions are spaced a predetermined distance on said carrying means proportional to a predetermined distance of relative movement between said press and said support means, the spacing between adjacent elements being a whole multiple of the spacing between the associated positions.

5. A fabrication system according to claim 1 wherein said control means includes switch means and said index means includes a rotatable wheel, said wheel mounting a plurality of spaced-actuating pins about the periphery thereof, the spacing of successive adjacent pins one from the other being proportional to the successive predetermined spacing between the joints, and means drivingly connecting said wheel to said moving means for rotating said wheel to successively actuate said switch.

6. A fabrication system according to claim 5 wherein said wheel has a plurality of spaced recesses opening through a sideface and adjacent the periphery thereof for receiving said pins, and magnetic means for releasably retaining said pins in said recesses, said pins being movable between the recesses to selectively vary the spacing between adjacent pins.

7. A fabrication system according to claim 1 wherein said index means is arranged in controlling relation to said moving means to successively stop the relative movement between said press and said support means.

8. A fabrication system according to claim 7 wherein said moving means includes fluid motor means and a fluid circuit therefor having valve means controlling said fluid motor means, said index means including switch means arranged in controlling relation to said valve means to shift the latter and stop said fluid motor means.

9. A fabrication system according to claim 1 wherein said press includes a press platen and at least one fluid-actuated cylinder operable to move said platen toward and away from the joints, said control means including a fluid control circuit having electrically actuated valve means operably connected with said cylinder, an electrical circuit arranged in controlling relation to said valve means, and switch means in said electrical circuit, said indexing means being operable to actuate said switch means to energize said electrical circuit and shift said valve to move the press platen toward and away from the joint.

10. A fabrication system according to claim 7 wherein said moving means includes a fluid motor and said press includes a press platen and at least one fluid actuated cylinder operable to move said platen toward and away from the joints, said control means including a fluid control circuit having electrically actuated valves operably connected with said fluid motor and said cylinder, an electrical circuit arranged in controlling relation to said valves, and switch means in said electrical circuit, said indexing means being operable to actuate said switch means to energize said electrical circuit to shift said valves to stop the relative movement of said press and said support means and move the press platen toward and away from the joint.